(12) United States Patent
Hornbeck et al.

(10) Patent No.: US 6,387,284 B2
(45) Date of Patent: May 14, 2002

(54) ON-CHIP SINGLE LAYER HORIZONTAL DEFLECTING WAVEGUIDE AND DAMASCENE METHOD OF FABRICATING THE SAME

(75) Inventors: Verne C. Hornbeck; Derryl D. J. Allman, both of Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/876,749

(22) Filed: Jun. 6, 2001

Related U.S. Application Data

(62) Division of application No. 09/217,182, filed on Dec. 21, 1998, now Pat. No. 6,282,358.

(51) Int. Cl.[7] .................................................. G02B 6/10
(52) U.S. Cl. .................... 216/24; 385/131; 385/132; 216/39; 216/67; 216/72; 216/88
(58) Field of Search ............................ 385/132, 131, 385/129, 130; 216/24, 39, 100

(56) References Cited

U.S. PATENT DOCUMENTS 5,055,426 A * 10/1991 Manning
5,198,008 A * 3/1993 Thomas
5,219,787 A * 6/1993 Carey et al.
5,235,663 A * 8/1993 Thomas
5,291,574 A * 3/1994 Levenson et al.
5,434,935 A * 7/1995 Kragl
5,465,860 A * 11/1995 Fujimoto et al.
5,540,346 A * 7/1996 Fujimoto et al.
5,614,765 A * 3/1997 Avanzino et al.
5,661,077 A * 8/1997 Oh et al.
5,708,303 A * 1/1998 Jeng et al.

* cited by examiner

Primary Examiner—Frank G. Font
Assistant Examiner—Layla Lauchman

(57) ABSTRACT

A horizontal deflecting optical waveguide is formed in an integrated circuit-like structure having a substrate and at least one layer of dielectric material above the substrate. A trench is formed in the dielectric material, and the trench has first and second portions angularly joined at a bent portion. A reflective layer of material adjoins, conforms to and extends along the side walls of the trench. A core of optically transmissive material conforms to the reflective layer within the trench. The reflective layer forms a wall at the bent portion which reflects light from the core located in one portion into the core located in the other portion.

8 Claims, 4 Drawing Sheets

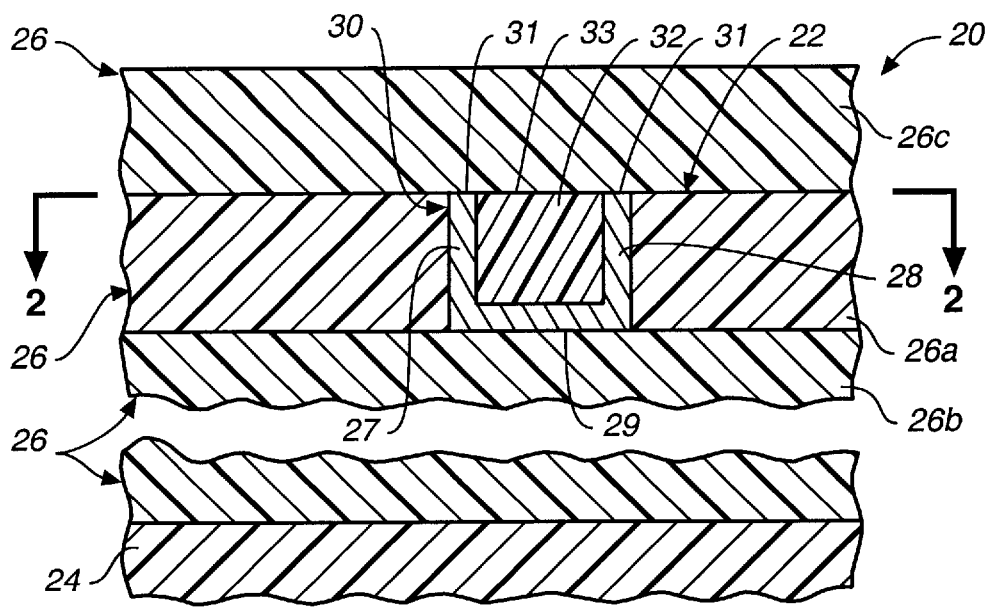
FIG._1
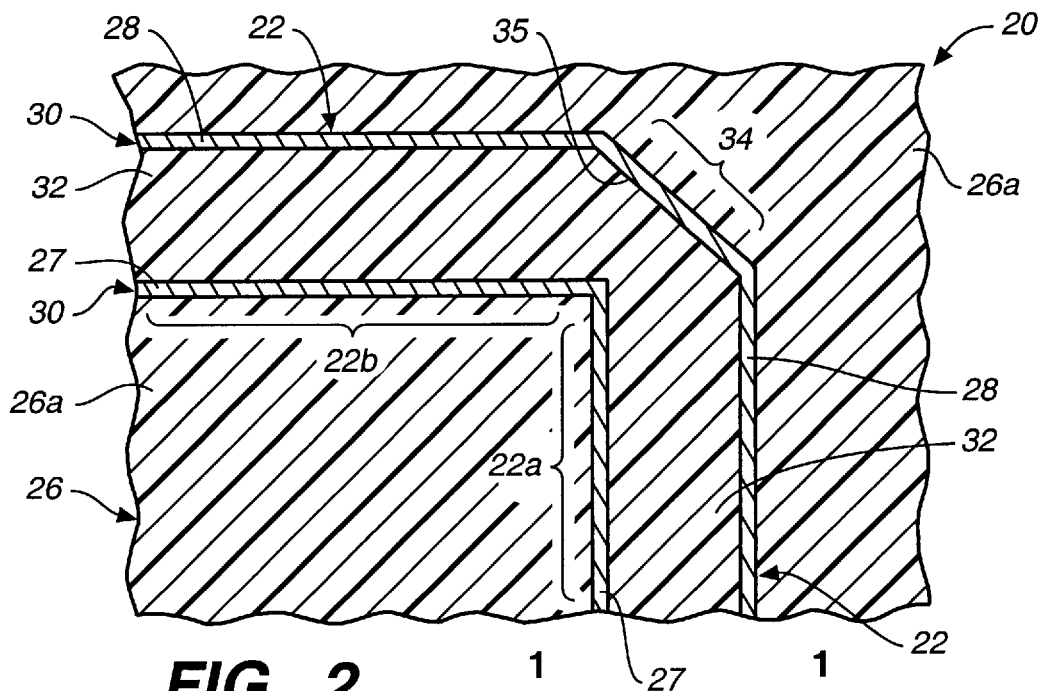
FIG._2

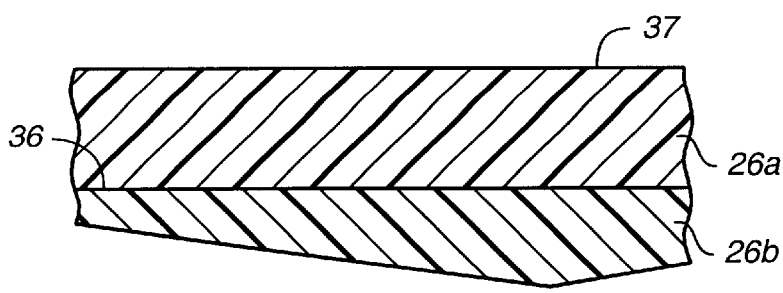
FIG._3
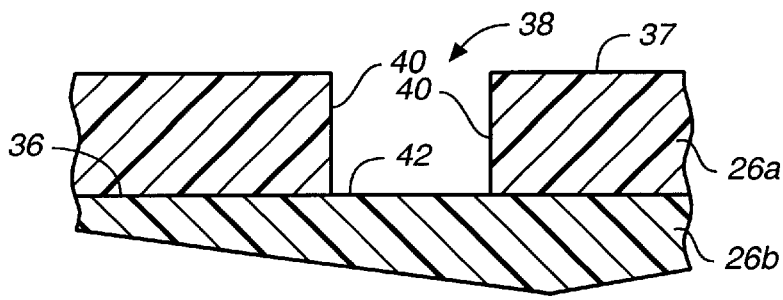
FIG._4
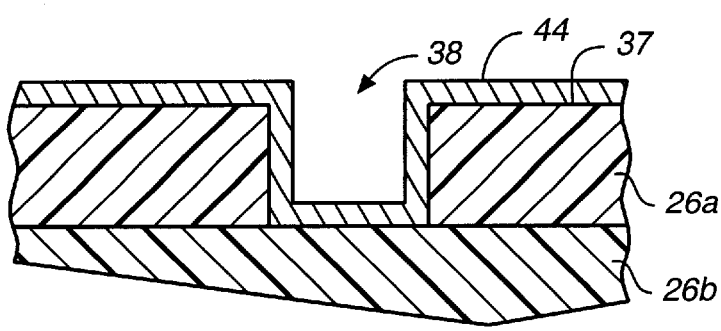
FIG._5
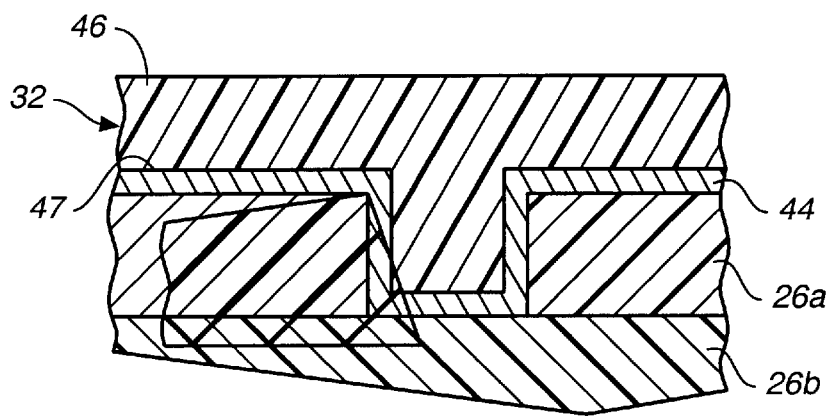
FIG._6

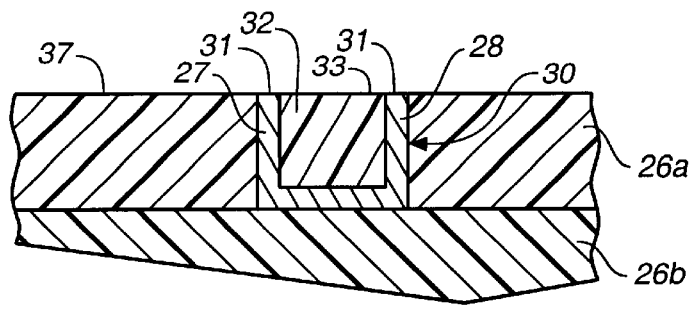
FIG._7
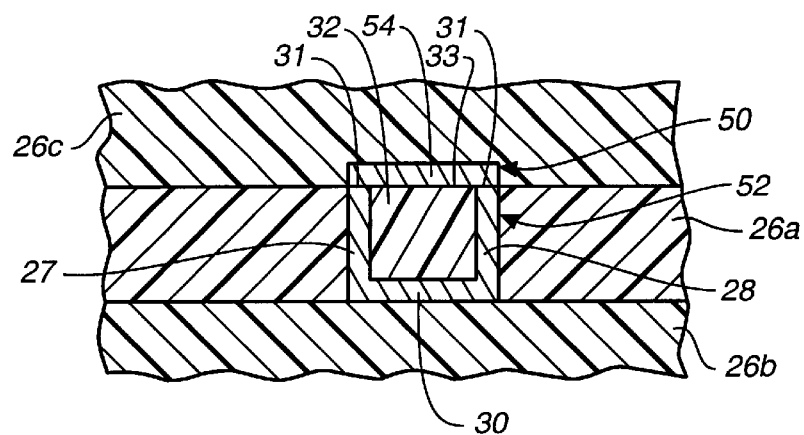
FIG._8
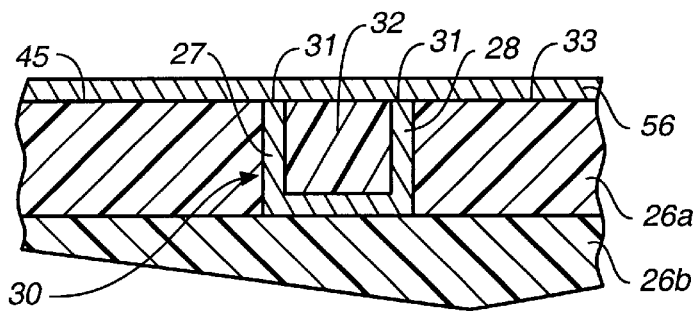
FIG._9
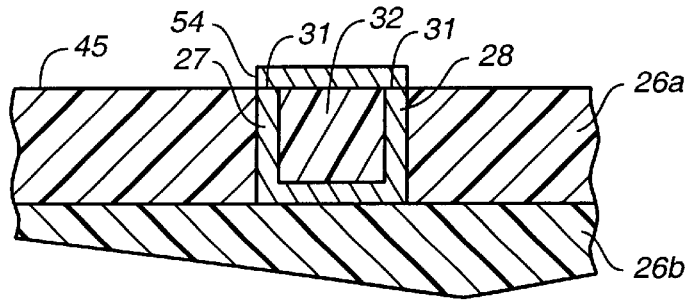
FIG._10

ON-CHIP SINGLE LAYER HORIZONTAL DEFLECTING WAVEGUIDE AND DAMASCENE METHOD OF FABRICATING THE SAME

This is a divisional of application Ser. No. 09/217,182, filed Dec. 21, 1998, now U.S. Pat. No. 6,282,358.

This invention relates to routing optical signals using optical waveguides located in layers of interconnect optical waveguides in an integrated circuit (IC)-like structure. More particularly, this invention relates to a new and improved optical waveguide having the capability to route an optical signal in horizontally deflected directions within the same waveguide. The invention also relates to a new and improved method of fabricating the optical waveguide in an IC-like structure using damascene fabrication process steps that are typically employed in the fabrication of electrical integrated circuits.

CROSS-REFERENCE TO RELATED INVENTION

This invention is related to the inventions for a "On-Chip Graded Index of Refraction Optical Waveguide and Damascene Method of Fabricating The Same" and "On-Chip Multiple Layer Transitioning Optical Waveguide and Damascene ofMethod of Fabricating the Same," described in concurrently filed U.S. patent application Ser. Nos. 09/217,183 and 09/217,184, respectively. These applications are assigned to the assignee hereof. The subject matter of these applications is incorporated herein by this reference.

BACKGROUND OF THE INVENTION

The ongoing evolution of microcircuit design has focused on the speed and size of electrical integrated circuit (IC) components, typically in a silicon chip. IC designers have continuously strived to make the IC faster while taking up less chip space. Currently, interconnection technology is considered as one of several areas that may be advanced to both increase the speed of the IC and to decrease the size of the chip. For instance, since most of the conductors that interconnect various functional components on the chip are made of metal and carry electrical signals, advances are being made in various metal compositions that can carry similar signals at a faster speed but which are smaller and thus consume less space.

Optical signals carried by waveguides are sometimes considered as replacements to the more common electrical signals carried by metal conductors. Optical signals allow the IC to operate more quickly or at a higher speed, and unlike electrical signals, optical signals are usually not susceptible to noise and interference. In general, optical conduction and reduced susceptibility to noise and interference obtain increased speed in data transmission and processing.

Furthermore, due to the coherent nature of laser optical signals and their reduced susceptibility to noise, many more optical signals can be routed in one waveguide or layer of waveguides than is possible using conventional electrical signal interconnect conductors. Therefore, an IC-like structure incorporating optical interconnect waveguides may have fewer waveguides and consume less space.

One typical type of optical interconnection between two IC components comprises a single waveguide or channel between the two components. In general this single waveguide is a straight conductive path between conversion devices which convert electrical signals to optical signals and convert optical signals to electrical signals.

Another type of controllable optical interconnect is called a "railtap." A railtap comprises a first conversion device that converts an electrical signal from a first IC component to an optical signal, an interconnect waveguide that conducts the optical signal from the first conversion device to a second conversion device, where the second conversion device converts the optical signal to an electrical signal and applies it to the second IC component. Upon receiving an electrical signal from the first component, the railtap diverts an optical light signal from a light source waveguide into the interconnect waveguide. An active waveguide polymer is connected to electrodes, and the electrodes create an electric field about the active waveguide polymer, causing a change in the index of refraction of the polymer, usually making it closer to the index of refraction of the source waveguide. When the index of refractions of the railtap and the source waveguide are similar, light is refracted from the source into the railtap polymer. Light is thereby transmitted selectively through the interconnect waveguide toward the second component as a result of applying the electric field to the electrodes on the active waveguide polymer.

The typical waveguide is formed of light transmissive material which is surrounded by an opaque cladding material. Optical signals propagate through the channel, guided by the cladding material. As the optical signals propagate through a particular waveguide, the signals impinge on the cladding material. If the index of refraction of the cladding material is lower than the index of refraction of the material within is channel, the majority of the impinging light signal reflects from the cladding material and back towards the center of the channel. Thus the signal propagates through the channel as a result of reflection at the interface of the cladding material.

On the other hand, if the index of refraction of the cladding material is equal to or greater than the channel material, the impinging light signal tends to refract into the cladding material, thus drawing some or all of the optical power of the light signal out of the waveguide. As more light is drawn out of the waveguide, the intensity of the signal received from the waveguide is reduced. An ideal, lossless waveguide propagates an optical signal without losing any signal intensity through refraction.

The physical placement of the various functional components in the substrate of the IC-like structure and in its interconnect layers generally requires flexibility in layout. Optical waveguides used as interconnects in IC-like structures are formed as singular straight channels, since light signals do not bend around corners. The channel can bothnot incorporate any bends or corners because the light signal will not follow the channel. Once an optical signal propagates the length of the straight channel, a directional coupler must redirect the optical signal if a change in direction is desired. Direction couplers substantially increase the manufacturing cost and size of the IC-like structure. The requirement that the optical waveguides extend in straight lines is a substantial disadvantage in the layout of optical IC-like structures, unlike electrical ICs where the electrical conductors can be routed in essentially any direction and shape to accommodate various aspects of circuit layout.

It is with respect to these and other considerations that the present invention has evolved.

SUMMARY OF THE INVENTION

An aspect of the present invention relates to guiding an optical signal in a changed direction using only an optical waveguide within a single optical interconnect layer of an IC-like structure. Another aspect relates to splitting an optical signal into two separate signals and propagating those signals in different directions within a single optical interconnect layer of an IC-like structure. A further aspect of the present invention relates to improving the ability to lay out optical waveguides as optical interconnects in an IC-like structure. A further aspect relates to fabricating optical waveguides having the above-noted capabilities using known damascene process steps already used to fabricate electrical ICs.

In accordance with these and other aspects, the invention relates to-a horizontal deflecting optical waveguide formed in an integrated circuit-like structure having a substrate. The optical waveguide includes at least one layer of dielectric material positioned above the substrate, and a trench in the dielectric material which has side walls. The trench has first and second portions joined at a bent portion where the first and second portions extend in an angular relation with respect to each other. A reflective layer of material adjoins, conforms to, and extends along the side walls of the first, second and bent portions of the trench. A core of optically transmissive material adjoins and conforms to the reflective layer within the trench. The reflective layer forms a wall at the bent portion which reflects light from the core located in one portion into the core located in the other portion.

In accordance with other aspects, the invention also relates to a method of fabricating a horizontal deflecting optical waveguide in interlayer dielectric material located above the substrate of an integrated circuit-like structure. The method involves forming a trench having first and second portions joined at a bent portion in the dielectric layer, where the first and second portions extend in an angular relation with respect to one another, forming a wall in the trench which extends at an angle with respect to the first and second portions, forming a reflective layer of material in the trench and on the wall,. and forming a core of optically transmissive material within an interior of the reflective layer.

Other preferred aspects of the invention relate to a beam splitter. At least three segments of the waveguide are formed and connected. A wall extends into the trench at the junction of the three segments, and a reflective layer of material is formed on the wall. The reflective layer on the wall reflects light from the core of one segment into the cores of the other two segments.

Other preferred aspects of the invention relate to the following features described in this paragraph. The core is surrounded by the reflective layer except on one side, and the index of refraction of the core is greater than the index of refraction of the dielectric material on the side where the core is not surrounded by the reflective layer. The reflective layer may be formed in a U-shaped configuration to facilitate depositing the reflective layer in the trench in a self-aligning manner. A cap of reflective material may be deposited and formed between ends of the U-shaped reflective layer, causing the cap and the U-shaped reflective layer to encircle the core. The reflective layer is integrally continuous over the side walls of the trench and the wall at the bent portion which causes the reflection. The core material is also deposited in a self aligning manner with regard to the reflective layer.

As a result of these new and improved features, optical waveguides may be employed more effectively in interconnect layers of an IC-like structure, because they may be bent and oriented in configurations other than straight lines, without using separate functional directional couplers.

Furthermore, optical signals may be split or combined without using separate functional devices to accomplish the splitting or combination. The steps to fabricate the optical waveguide are conventional IC fabrication steps. The conventional fabrication steps contribute to the reliability and yield of the process, while allowing optical waveguides to be incorporated in electrical IC-like structures as well as in purely optical IC-like structures. The waveguide is capable of being fabricated using self aligning techniques, which also contribute to the ease and reliability in fabrication.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and by reference to the appended claims.

BRIEF DESCRIPTION OF THE DRAWINGS

FIG. 1 is a partial, vertical cross-sectional view of an integrated circuit-like structure having an on-chip single layer horizontal deflecting optical waveguide which incorporates the present invention.

FIG. 2 is a partial top plan view of the horizontal deflecting optical waveguide shown in FIG. 1, taken substantially in the plane of line 2—2 shown in FIG. 1 and further illustrating at line 1—1 the cross-sectional view from which FIG. 1 was taken.

FIGS. 3–7 are cross-sectional views showing a sequence of steps involved in fabricating the waveguide shown in FIGS. 1 and 2, according to the present invention.

FIG. 8 is a partial, vertical cross-sectional view of an integrated circuit-like structure incorporating another embodiment of an on-chip single layer horizontal deflecting optical waveguide which incorporates the present invention, wherein the FIG. 8 embodiment may be substituted for that shown in FIG. 1.

FIGS. 9–10 are cross-sectional views showing modified sequence process steps involved in fabricating the waveguide shown in FIG. 8 according to the present invention.

DETAILED DESCRIPTION

Figure 11:
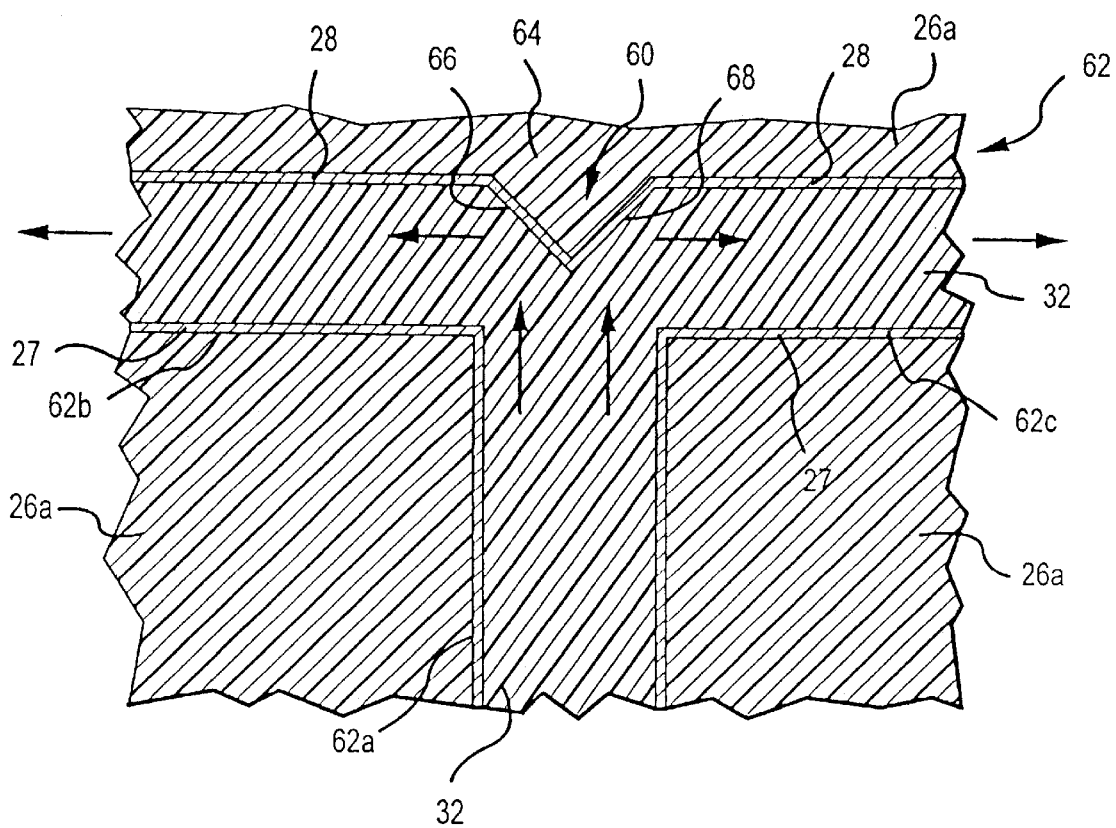
FIG. 11 is a top plan view of an on-chip single layer beam splitting horizontal deflecting waveguide which incorporates the present invention, wherein the FIG. 11 embodiment may be substituted for that shown in FIG. 2.

A portion of an integrated circuit (IC)-like structure 20 incorporating a single layer horizontal deflecting optical waveguide 22 is shown in FIGS. 1 and 2. The IC-like structure 20 may have functional electronic components (not shown) located in a substrate 24, and these may be electrically connected to each other by interconnect conductors (not shown) located in layers above the substrate 24 or by waveguides (such as that shown at 22) which are also located in layers above the substrate 24. Insulation-type dielectric material 26, formed in layers 26a, 26b, 26c, etc., separates the electrical components of the substrate 24 from interconnect conductors and waveguides.

In some types of IC-like structures, waveguides may be used exclusively to form interconnects between electrical components. In other types of IC-like structures, both optical waveguides and electrical conductors may be used as interconnects between functional components. In still other types of IC-like structures, only waveguides may be formed as optical interconnects, and the functional components connected to those waveguide optical interconnects will be located external to the IC-like structure.

The waveguide 22 is made of an optically transmissive center or core 32 and a reflective layer 30, as shown in FIG. 1. The reflective layer 30 is preferably U-shaped and is made of optically reflective material such as metal. The U-shaped reflective layer 30 has leg portions 27 and 28 that extend substantially vertically (as shown) and a bottom portion 29 that extends substantially horizontally (as shown) between the bottom ends up the leg portions 27 and 28. The leg and bottom portions 27, 28 and 29 have a substantially equal or uniform thickness. Preferably the U-shaped reflective layer 30 is formed by deposition, is relatively thin, and is made of aluminum or other similarly reflective material.

The optically transmissive core material 32 of the waveguide 22 is positioned within and conforms to interior of the U-shaped reflective layer 30. As shown in FIG. 1, the core material 32 is substantially rectangular and preferably square. An upper surface 33 of the core material 32 is preferably flush with upper edges 31 of the U-shaped reflective layer 30.

The reflective material of the layer 30 surrounds the core 32 except at the upper surface 33 of the core 32. In this location, the core 32 adjoins the dielectric material of the layer 26c. In this location, the dielectric material layer 26c forms a cladding for the waveguide 22. The dielectric material of the layer 26c may or may not be light transmissive material. Preferably, however, the interlayer dielectric material 26 has a relatively low index of refraction compared to a relatively higher index of refraction of the core 32. The relatively higher index of refraction of the core 32 compared to the dielectric material layer 26c causes some of the light energy in the core 32 to reflect from the surface 33 back into the core 32 rather than to be absorbed by the dielectric material layer 26c. Thus the optical losses of the waveguide 22 are decreased by the relatively higher index of refraction of the core 32 compared to the dielectric material 26.

The dielectric material 26 in the layer 26c located above the waveguide 22 is similar to the dielectric material 26 in the layer 26b located below the waveguide 22 and is similar to the layer 26c of dielectric material 26 located on the sides of the waveguide 22. The material 26c above the waveguide 22 may separate the waveguide 22 from other upper layers of interconnect waveguides (not shown), which are described in the concurrently filed application for "On-Chip Multiple Layer Transitioning Optical Waveguide and Damascene Method of Fabricating the Same," noted above.

As shown in FIG. 2, the waveguide 22 incorporates a bent portion 34. In essence, the bent portion 34 couples two relatively straight waveguide segments 22a and 22b extending in angular directions with respect to each other. For example as shown in FIG. 2, the straight waveguide segments 22a and 22b are perpendicular to each other. The bent portion 34 comprises a relatively flat vertical wall 35 of the U-shaped portion 30 which extends at an angle to the longitudinal direction of each leg portion 28. In essence, the vertical wall 35 is a continuation of the leg portions 28 of the waveguide segments 22a and 22b, thus integrating the leg portions 28 and the wall 35. Like the U-shaped portion 30, the wall 35 is reflective and is preferably formed of the same type of reflective material as that used to form the U-shaped portion 30 (FIG. 1).

The reflective wall 35 reflects light signals which impinge on it at an angle substantially equal to the incident angle, i.e., the angle at which the light signal impinges on the wall 35. A light signal traveling into the waveguide segment 22a will reflect off of the wall 35 into the waveguide segment 22b. Since the wall 35 extends at a 45° angle with respect to the direction of signal propagation (generally parallel to the leg portions 27 and 28 of the waveguide segments 22a and 22b), the signal impinges on the wall at a 45° angle. The wall 35 reflects the light signal at a 45° angle, causing the light signal to propagate through the waveguide segment 22b. Because of the angle of the wall 35 relative to the waveguide segments 22a and 22b, the light signal undergoes a 90° change of direction. Obviously, other angles of change of direction may be accomplished by the angle of the wall 35 relative to the waveguide segments.

The waveguide 22 obtains many advantages and improvements over known waveguides used as optical interconnects in an IC like structure, because of its bent portion 34. A singular waveguide 22 can be extended and bent as necessary in an optical interconnect layer to deliver the optical signal in desired locations on the IC-like structure, without using directional couplers. Furthermore, the optical signal can be propagated along almost any path without concern for laying out the functional components of the IC-like structure so that straight optical interconnects extend between them.

The waveguide 22 is particularly useful in conducting so-called single mode optical signals. Single mode optical signals are polarized and generally have their radiation energy oscillating in a single plane. In the case of the optical waveguide 22, the single mode oscillation of the light energy is in a horizontal plane. The horizontally oscillating energy encounters the vertical legs 27 and 28 and the wall 35 of the U-shaped reflective layer 30 which confine the substantial. majority of the horizontally oscillating light energy in the core material 32. Thus, the single mode oscillations in the horizontal plane will not normally be rotated or disturbed to avoid interaction with the U-shaped reflective layer 30.

Should the light energy be disturbed from the polarized horizontal oscillating plane, a graded index of refraction effect will result when any light energy encounters the surface 33 of the core material 32 which interfaces with the dielectric material 26c. A slight refractive effect will occur because of the relatively higher index of refraction of the core material 32 compared to that of the dielectric material 26c. Thus a refractive effect is obtained at the upper surface 33 of the core material, but some of the light energy is lost into the dielectric material 26c. Thus the waveguide 22 does not provide an entire reflective capability surrounding the core material 32 on all sides. In many applications, the location of the reflective layer 30 on three sides of the core material 32 is adequate.

The waveguide 22 can be formed using conventional damascene semiconductor fabrication techniques, using the same materials and process steps employed in creating electrical IC-like structures 20, even when that structure 20 includes electronic components in addition to the optical components. Details concerning the process steps for fabricating the optical waveguide 22 shown in FIGS. 1 and 2 are described below in sequence in conjunction with FIGS. 3–7.

The process of fabricating the waveguide 22 generally begins at the stage shown in FIG. 3, where an additional layer 26a of dielectric material has been formed on an upper surface 36 of the lower layer 26b of dielectric material, using conventional deposition techniques. Preferably the dielectric material of the layer 26a is of the same type as the dielectric material of the layer 26b. However, the material of the layer 26b may comprise a material other than conventional electrical dielectric insulating material.

Generally, the upper surface 36 of the layer 26b has been previously polished and thus the surface 36 is relatively planar. The layer 26a of dielectric material is deposited by conventional techniques such as chemical vapor deposition (CVD) or a spin-on deposition. A relatively uniform depth of dielectric material in the layer 26a results, having a relatively smooth upper surface 37.

The next step involves forming a trench 38 into the layer 26a, as shown in FIG. 4. The trench 38 is preferably formed by etching, and the etching is preferably accomplished using conventional photoresist deposition, photolithographic patterning and reactive ion etch steps. Reactive ion etching creates the trench 38 with substantially vertical side walls 40 and a substantially horizontal bottom surface 42. The trench 38 extends down to the upper surface 36 of the lower layer 26b of the dielectric material 26. Any of several known techniques can be used to control the depth of the trench 38. For example, one technique involves stopping the reactive ion etch process at a predetermined time related to the depth to which the etching has progressed. Another technique involves forming a conventional etch stop layer on the upper surface 36 of the layer 26b (FIG. 2) prior to depositing the dielectric material layer 26a. An etch stop layer is a thin layer of a substance which changes the characteristics or chemical composition sufficiently to cause the reactive ion etching to stop when it reaches the etch stop layer, as is known.

The depth and width of the trench 38 is selected to accommodate the characteristics of the horizontally polarized optical waves guided by the waveguide 22. Depending on the frequency characteristics of the optical signals conducted, the depth and width should be deep and wide enough to accommodate an integer number of wavelengths, as is known in the field of optical signal transmission.

Next, a layer 44 of reflective material such as metal is deposited on the side walls 40 and the bottom surface 42 of the trench 38, and on the adjacent upper surface 36 of the layer 26b of dielectric material 26a as shown in FIG. 5. The reflective layer 44 is preferably deposited using chemical vapor deposition. The reflective layer 44 is of a relatively uniform thickness.

The next step involves depositing a coating 46 of the core material 32, as shown in FIG. 6. The coating 46 fills the opening remaining in the trench 38 after the reflective layer 44 has been deposited and also preferably covers upper surfaces 47 of the reflective layer 44. The core material 32 must completely fill the open interior of the reflective layer 44 within the trench 38.

Once the core material 32 has been deposited in the coating 46, the upper surface of the coating 46 and the upper surface of the reflective layer 44 are removed using chemical-mechanical polishing (CMP), as shown in FIG. 7. The CMP step removes substantially all of the layer 44 of the reflective material 32 and the coating 46 of the core material 32 outside of the trench 38 and above the upper surface 37 of the dielectric material layer 26a, leaving only the U-shaped reflective layer 30 and the core material 32 within the trench 38. The CMP step also causes the upper surface 33 of the core material 32, the upper edges 31 of the legs 27 and 28 of the Unshaped reflective layer 30 and the upper surface 37 of the layer 26a of the dielectric material 26 to become substantially planar.

Following the CMP process step shown in FIG. 7, the process of forming the waveguide 22 is completed by depositing upper layer 26c of dielectric material 26 on the upper surface 37 of the dielectric material layer 26a, as shown in FIG. 1. The layer 26c covers the upper edges 31 of the U-shaped reflective layer 30 and the upper surface 33 of the core material 32, as shown in FIG. 1. The deposition of the upper dielectric material layer 26c is accomplished by steps similar to the deposition of the material 26a as shown in FIG. 3. Preferably, the deposition of the upper dielectric material layer 26c is accomplished by either conventional CVD or spinon processes.

The fabrication of the waveguide 22 using the steps described in FIGS. 3–7 does not involve any new or unusual process steps. The steps employed are well known in the field of conventional electrical IC fabrication. The process steps involve the use of damascene fabrication techniques, which are well-known and conveniently applied in conventional electrical IC fabrication processes. Many of the steps are self-aligning, as shown in FIGS. 5 and 6, which further contribute to the relative ease of practicing the fabrication technique. The steps are highly reproducible and have a known yield predictability rate, which contributes to reliability in manufacturing.

Although the waveguide 22 shown in FIGS. 1 and 2 is primarily useful in transmitting single mode optical signals, another waveguide 50 of the present invention, shown in FIG. 8, is useful primarily in conducting multi-mode optical signals. Multi-mode optical signals have oscillations of optical energy in mutually perpendicular planes or in any number of planes parallel to an axis extending along the waveguide 50.

The waveguide 50 shown in FIG. 8 is essentially similar to the waveguide 22 shown in FIGS. 1 and 2 except for an encircling reflective layer 52. The encircling reflective layer 52 is formed by a cap portion 54 which is formed on the U-shaped reflective layer 30. The cap portion 54, in conjunction with the U-shaped reflective layer 30, creates the encircling reflective layer 52 which completely surrounds and encloses the core material 32. The cap portion 54 extends across the U-shaped layer 30, contacting both upper edges 31 of the leg portions 27 and 28 while extending across the upper surface 33 of the core material 32. The cap portion 54 is made of the same material used to form the U-shaped reflective layer 30; consequently the entire encircling reflective layer 52, formed by the cap portion 54 and the U-shaped portion 30, has the same index of refraction.

The cap portion 54 creates a reflective effect at the top surface 33 of the core material 32 in the same manner that the U-shaped reflective layer 30 creates a reflective effect on the other three sides of the core material 32. As optical signals propagate through the core material 32, the light energy impinges on the cap portion 54, rather than being refracted into the upper layer 26c of dielectric material 26. The reflective effect from the cap portion 54 reflects the light energy back into the core material 32. Since the material of the top portion is reflective, total internal reflection may be achieved. Thus, by incorporating the cap portion 54 in the waveguide 50, multi-mode signals may be conducted within the waveguide without, or with significantly less, losses of energy.

The waveguide 50 is fabricated using a continuation of the same process steps used in fabricating waveguide 22 previously discussed above in connection with FIGS. 3–7. Once the CMP process step discussed with respect to FIG. 7 is complete, a layer 56 of reflective material is deposited on the upper surface 37 of the dielectric material layer 26a, on the upper edges 31 of the leg portions 27 and 28, and on the upper surface 33 of the core material 32, as shown in FIG. 9. The layer 56 is preferably of the same reflective material from which the U-shaped reflective layer 30 has previously been formed. The layer 56 is preferably deposited using CVD or spin-on deposition techniques. The width of the layer 56 is sufficient to span the horizontal width between the upper edges 31 of the leg portions 27 and 28 of the U-shaped reflective layer 30, including the waveguide segments 22a and 22b and the bent portion 34 (FIG. 2). In general, the layer 56 will cover the entire upper surface 37 as shown in FIG. 9.

Next, using standard lithographic techniques, portions of the layer 56 which are positioned laterally to the exterior of the upper edges 31 of the leg portions 27 and 28 in all of the waveguide segments 22a and 22b, and to the exterior of the wall 35 in the bent portion 34 (FIG. 2), are patterned and etched away as shown in FIG. 10. The etching process leaves the cap portion 54 in contact with the upper edges 31. Thereafter, the upper dielectric material layer 26c is deposited to complete the waveguide 50, as shown in FIG. 8.

The same series of process steps described in FIGS. 3–7, 9 and 10 may be employed to create a beam splitter portion 60 in a branched waveguide 62, as shown in FIG. 11. The branched waveguide 62 is formed by three straight segments 62a, 62b and 62c. The waveguide segments 62a, 62b and 62c extend at perpendicular angles with respect to one another, and the waveguide segments 62b and 62c extend linearly with respect to one another. The beam splitter 60 joins the three segments 62a, 62b and 62c to complete the branched waveguide 62.

The beam splitter 60 is formed by a triangular shaped projection 64 which extends into the core 32 at the junction of the waveguide sections 62a, 62b and 62c. Two reflective walls 66 and 68 are formed on the triangular projection 64. The walls 66 and 68 are continuations of and are integral with the leg portions 28 of the sections 62b and 62c. The walls 66 and 68 are also continuations of and are integral with the bottom portion 29 (FIG. 1) of the U-shaped reflective layer 30. Furthermore, the walls 66 and 68 are joined together at the apex of the triangular projection 64. The walls 66 and 68 are substantially vertical and flat and extend the full vertical height (as shown in FIGS. 1 and 8) of the core 32 of the waveguide sections 62a, 62b and 62c. The walls 66 and 68 are preferably formed of the same reflective material as the U-shaped portions 30 of the waveguide segments 62a, 62b and 62c, and thus reflect light energy which impinges on them. Although not shown in FIG. 11, a cap portion 54 (FIG. 8) may also be formed in the manner described on top of the U-shaped portions 30 and the walls 66 and 68 of the beam splitter.

The walls 66 and 68 extend from the leg portions 28 of the U-shaped reflective layers 30 of the waveguide segments 62b and 62c at an obtuse angle. In the example shown in FIG. 11, the obtuse angle is 135°. The walls 66 and 68 join together at an angle of 90° at the apex of the triangular projection 64. With this geometry, the walls 66 and 68 extend at an angle of 45° with respect to waveguide section 62a. Moreover the intersection of the sides 66 and 68 occurs along the center longitudinal axis of the waveguide portion 62a.

An optical light signal injected into the waveguide section 62a impinges the walls 66 and 68. The portion of the signal that impinges on the wall 66 is reflected into the waveguide section 62b, and the portion of the signal that impinges on the wall 68 is reflected into the waveguide section 62c. Portions of the signal are therefore split and reflected in opposite directions. Although the splitting function is illustrated in FIG. 11 as splitting the signal to propagate in opposite directions, the geometry of the beam splitter 60 and the orientation of the walls 66 and 68 can be adjusted to split a single optical signal into light paths which divert at virtually any angle.

The beam splitter 60 and the waveguide 62 may be fabricated by the techniques described above in connection with FIGS. 3–7. In addition, if a cap portion 54 (FIGS. 8 and 10) is used on the beam splitter 60 and the waveguide 62, the application steps also include those described above in conjunction with FIGS. 9 and 10.

The beam splitter 60 may be used for a variety of different purposes, as will be recognized in the field of optics. For example, the separate beams derived from the splitter 60 may be used as single source optical signals. Single source optical signals are useful for interferometric purposes, among other things. Furthermore, by adjusting the lengths of the optical paths through which the optical signals are transmitted, the coherency of laser signals may be employed for in-phase and out-of-phase combining, for a variety of different purposes. Many other uses are apparent in the field of optics.

The light signal bending capabilities available from the present invention allows an optical signal to be guided in a changed direction using only an optical waveguide. The change in direction is accomplished in a single optical interconnect layer of an IC-like structure. The light splitting capabilities available from the present invention additionally allow a light signal to be created and diverted into two separate signals and propagated within a single optical interconnect layer of the IC-like structure. The beam bending, diverting and splitting capabilities improves the layout and adds more options to the layout of the optical waveguides in an IC-like structure. Lastly, the optical waveguides of the present invention may be conveniently fabricated using known damascene process steps already used to fabricate electrical ICs. As such, incorporating optical waveguides in an electrical IC-like structure, or simply constructing an entirely optical IC-like structure, is more easily and reliably accomplished by using known process steps which are compatible with other process steps used to fabricate the IC-like structure.

Preferred embodiments of the waveguides and methods of manufacturing them have been shown and described with a degree of particularity. The following claims define the scope of the invention, and that scope should not necessarily be limited to the preferred embodiments described above.

The invention claimed is:

1. A method of fabricating a horizontal deflecting optical waveguide in interlayer dielectric material located above a substrate of an integrated circuit-like structure, comprising the steps of:

forming a trench in the dielectric material, the trench having first and second portions joined at a bent portion where the first and second portions extend in an angular relation with respect to one another;

forming the trench to include a reflection wall extending at an angle with respect to the first and second portions;

forming a reflective layer of material in the trench and on the wall; and forming a core of optically transmissive material within the trench and interior of the reflective layer.

2. A method as defined in claim 1 further comprising the step of:

forming the trench into the dielectric material from an upper exposed surface of the dielectric material.

3. A method as defined in claim 2 further comprising the steps of:

depositing the reflective layer of material in a self-aligning manner within the trench; and depositing the core material in a self-aligning manner within the trench on and conforming to the reflective layer.

4. A method as defined in claim 3 further comprising the steps of:

polishing the materials of the reflective layer and the core to create upper ends of the reflective layer and an upper surface of the core which are substantially planar with to an upper surface of the dielectric layer; and depositing a cap of reflective material on the upper surface of the core and the upper ends of the reflective layer to encircle the core with the cap and the reflective layer.

5. A method as defined in claim 4 further comprising the steps of:

depositing a layer of reflective material on an upper exposed surface of the dielectric material, on the upper ends of the reflective layer, and on the upper surface of the core; and etching the layer of deposited reflective material to form the cap.

6. A method as defined in claim 1 further comprising the steps of:

forming the trench to have a third portion joined to the first and second portions at the bent portion, the second and third portions each extending at an angle from the first portion; and forming the wall at an angle with respect to the trench portions to reflect light from the core of the first portion into the cores of the second and third portions.

7. A method as defined in claim 1 further comprising the step of:

forming the reflective layer as an integral continuation of material over side walls of the portions of the trench and at the wall of the bent portion.

8. A method as defined in claim 1 further comprising the steps of:

depositing the reflective layer material in a self aligning manner within the portions of the trench and the bent portion; and depositing the core material in a self-aligning manner within the trench and bent portions on and conforming to the reflective layer.

* * * * *

UNITED STATES PATENT AND TRADEMARK OFFICE
CERTIFICATE OF CORRECTION

PATENT NO. : 6,387,284 B2
DATED : May 14, 2002
INVENTOR(S) : Verne C. Hornbeck and Derryl D.J. Allman It is certified that error appears in the above-identified patent and that said Letters Patent is hereby corrected as shown below:

<u>Title page,</u>
Item [75], Inventor's name should be corrected to read:
-- Inventors: Verne C. Hornback; Derryl D.J. Allman; both Colorado Springs, CO (US) --

Signed and Sealed this

Twelfth Day of August, 2003

JAMES E. ROGAN
*Director of the United States Patent and Trademark Office*